INVENTORS
HENRY W. BEVARLY
LEO C. SCHUHMANN
BY Mason, Kolehmainen,
Rathburn & Wyss.
ATTORNEYS

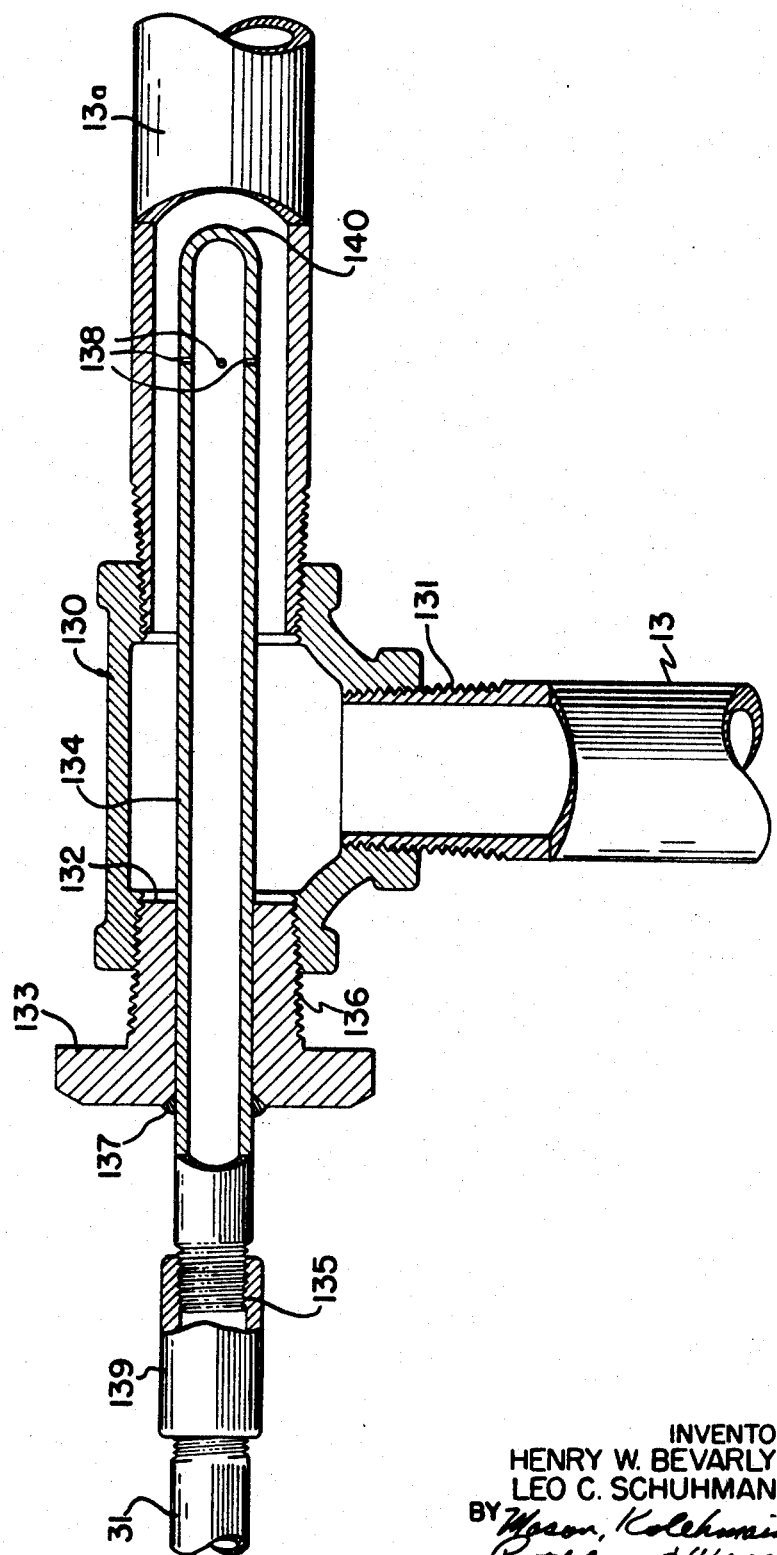

United States Patent Office

3,389,567
Patented June 25, 1968

3,389,567
METHOD OF CRYSTALLIZING FLUIDS
Henry W. Bevarly and Leo C. Schuhmann, Louisville, Ky., assignors to Chemetron Corporation, Chicago, Ill., a corporation of Delaware
Continuation of application Ser. No. 300,225, Aug. 6, 1963, which is a continuation of application Ser. No. 100,191, Apr. 3, 1961. This application Nov. 23, 1966, Ser. No. 611,189
4 Claims. (Cl. 62—58)

This case is a continuation of Ser. No. 300,225 filed Aug. 6, 1963, which is itself a continuation of Ser. No. 100,191, filed Apr. 3, 1961.

This invention relates to an improved method of crystallizing materials from fluids by freezing. More particularly this invention relates to a method of concentrating aqueous solutions, such as vinegar, fruit and vegetable juices and the like, by slush freezing wherein water is removed in the form of ice. It is also applicable to the crystallization of organic compounds, such as p-dichlorobenzene and DDT (2,2-bis - (p - chlorophenyl) - 1,1,1-trichloroethane).

It has been known that natural juices can be concentrated by slush freezing in apparatus such as rotary scraped-surface heat exchangers wherein the juice is passed through an annular space between a cylindrical outer heat exchange surface and an inner rotating shaft having members attached thereto which scrape the inner surfaces of the heat exchange surface. Refrigerating liquids are circulated in an outer jacket wherein the heat exchange surface is a part and the removal of heat causes the water in the juice contained within the annular space to freeze on the inner surface of the heat exchanger. The rotating member has scraper blades which remove the ice from the surface of the heat exchanger, thereby increasing the efficiency of heat transfer from the aqueous juice to the refrigerating liquid. The slurry of ice and concentrated juice passes out of the annular space and the ice is thereafter removed from the slurry by filtration or centrifugation. The liquid which is separated from the ice is thus concentrated by removal of water in the form of ice.

Freezing is sometimes carried to the point at which the solutes in the unfrozen syrup are two to four times as concentrated as in the original juice. The ice crystals, when produced from concentrated solutions, form a skeletal structure with spaces or interstices which contain the liquid concentrate. Freezing is often conducted at relatively low temperatures in order to shorten the freezing time. When this is done, most parts of the ice nearest the refrigerating surface attain lower temperatures than the more remote parts. Thus, for example, if liquid ammonia at 0° F. is used as the freezing medium, there will be produced a "shell" of frozen ice adjacent the refrigerating surface in a cylindrical heat exchanger, with a gradient temperature of from 5–10° F. between the cooling surface and the center of the cylinder. The concentrated juice contained in the outer shell adjacent the cooling surface will be viscous and sometimes jelly-like because of its high concentration and low temperature. In this state the concentrate does not readily flow through the passages between the ice crystals, and it is often difficult to separate the concentrate from the crystalline mass of ice. It is also difficult to wash the ice with water or dilute solutions to remove the concentrate adhering to or occupying the interstices between the ice crystals. Methods which have been devised for controlling or avoiding these conditions generally increase the cost by wasting some of the energy expended in freezing the solution, slowing up the overall process and by causing losses of valuable concentrates.

The use of cylindrical heat exchange apparatus with a rotating scraper member avoids some of these problems. Such apparatus is usually of the type having an elongated stationary cylindrical wall defining a processing chamber and surrounded by a jacket to provide an annular space through which a suitable cooling medium may be circulated for the purpose of removing heat from the material passing through the apparatus. Suitable insulation is usually provided to cover the jacket for added efficiency. Within the processing chamber a rotatable agitator shaft provided with suitable scraper blades is mounted and is driven from one end of the chamber by a motor or other source of power the speed of which can be selectively controlled. Such chilling apparatus is disclosed in the Bottoms et al. Patent No. 2,013,025, wherein a rapid extraction of heat from the material under treatment is obtained with concurrent agitation of material. After passing through the cylindrical processing chamber of the heat exchange apparatus, the material in the form of ice crystals and concentrate is transferred to a centrifuge or other suitable apparatus for separating solids from liquids. The concentrate in the form of a dense solution is removed and used as the final product or admixed with other concentrates. The ice which is so removed is generally washed with water or dilute solution to remove any of the desired materials adhering or included within the ice crystals. The washed ice is usually discarded because it contains little or no desirable materials.

It is an object of this invention to provide an improved procedure for crystallizing materials from solutions. It is another object of this invention to provide an improved method for concentrating aqueous solutions by partially freezing such solutions and removing ice therefrom. It is a further object to provide an improved system for processing aqueous solutions to concentrate them by removal of ice. Another object is to improve the efficiency of apparatus and procedures for concentrating aqueous solutions by forming and removing ice therefrom. A more specific object of this invention is to provide a method for concentrating aqueous solutions by partially freezing such slutions in a cylindrical heat exchange apparatus admixed with a stream of inert gas. These and other objects of this invention are apparent from and are achieved in accordance with the following disclosure when considered in conjunction with the attached drawings wherein:

FIGURE 2 is a view, partly in section, of a gas injection device used in this invention;

Figure 1:
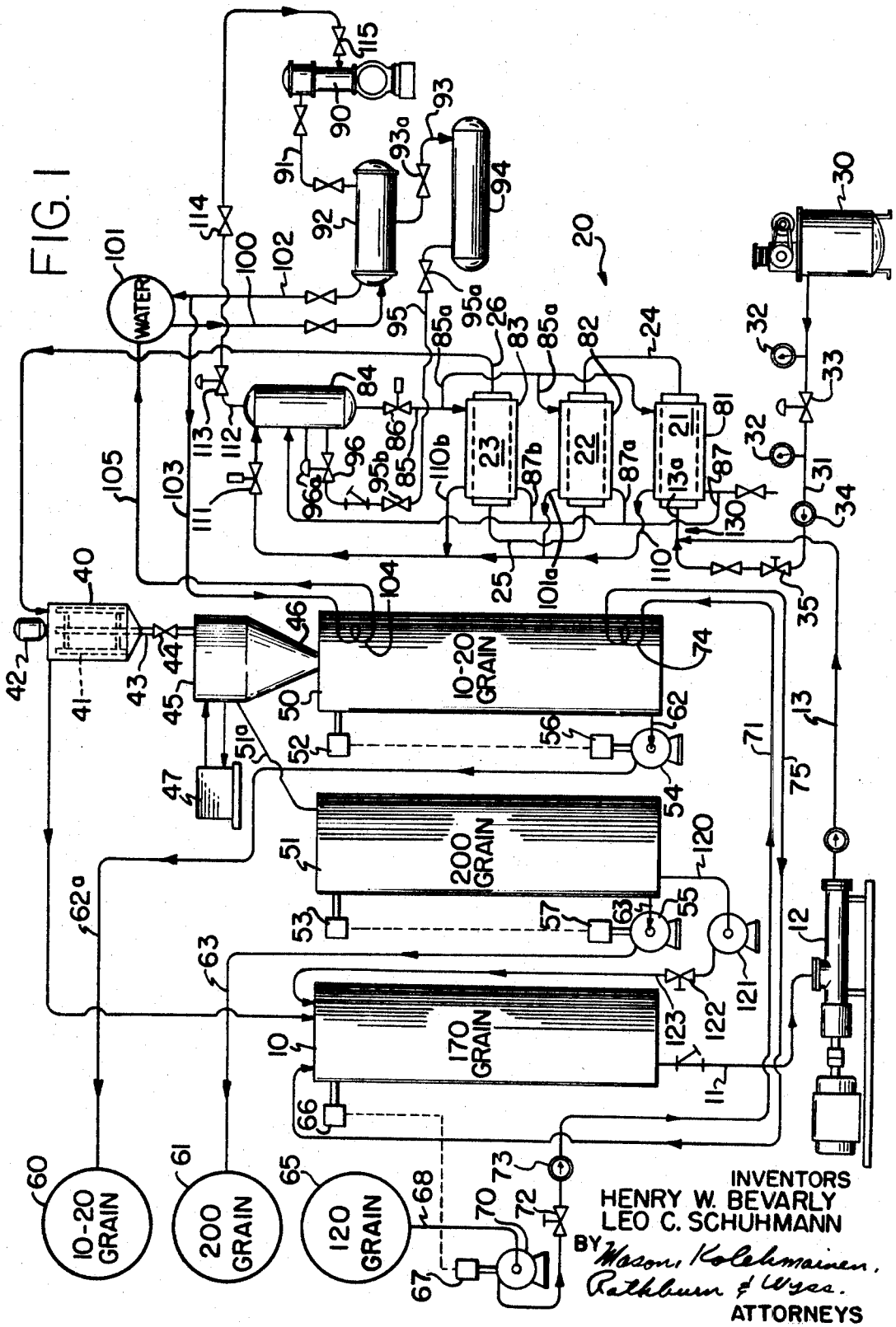
FIGURE 1 is a process flow diagram illustrating the treatment of liquids in accordance with this invention.

This invention is based on the discovery that the formation of crystalline solids from a solution by partial freezing in a cylindrical heat exchange apparatus provided with a rotating agitator shaft equipped with suitable scraper blades can be substantially improved by the injection of a stream of inert gas into the solution prior to or simultaneously with the chilling of the solution within the heat exchanger. The injection of the gas induces the precipitation of fine crystals and reduces the tendency of large crystals to form in the heat exchanger. The gas also is dispersed throughout the liquid, usually in the form of fine gas bubbles, and the fluid which is formed of gas and liquid is a fine foam which, on freezing, forms a porous solid or ice. This prevents the build-up of a shell of hard ice crystals near the cylindrical heat exchange surface and thereby improves the overall efficiency of the heat exchange process. The improvement in efficiency is shown by the fact that the power requirement for the heat exchanger is substantially reduced.

The freezing step is conducted in a cylindrical heat transfer apparatus which has a rotating shaft disposed axially (concentrically or slightly eccentrically) within the cylinder. The shaft carries a number of hinged scraper blades which press against the internal surface of the cylinder and scrape the surface as the shaft rotates. The cylinder is surrounded with a cooling jacket containing a cooling medium, such as chilled brine, Freon or liquid ammonia. The cooling medium is so selected that the temperature of the heat transfer surface is reduced to a value below the freezing point of the liquid being treated, thus causing formation of ice or solidified liquid on the inner surface of the heat transfer cylinder.

Apparatus suitable for use in this invention is known, such as that disclosed in the Bevarly Patent No. 2,980,-539, Apr. 18, 1961. The apparatus has means for introducing into the fluid to be processed a pre-determined amount of gas such as nitrogen or carbon dioxide at a pre-determined rate. The gas is supplied under sufficient pressure to overcome any hydrostatic head in the heat exchange apparatus. For example, pressures in the range of 10 to 100 p.s.i.g. are appropriate although in certain instances it may be desirable to raise the pressure to ranges as high as 300 to 400 p.s.i.g. The gas flows from a tank or other source through a pressure gauge, a control valve and a metering device, such as a rotometer. The metered gas flows through a conduit into a gas diffusion unit located near the inlet end of the heat exchange apparatus where the gas is mixed with the liquid to be tested. The gas preferably enters the heat exchange apparatus through a hollow tube, which is provided with a series of small apertures extending concentrically into the line conducting the liquid into the heat exchange apparatus. The gas flows through the small apertures in the inner tube into the liquid in the surrounding tube in the form of small bubbles which are relatively uniformly mixed with the material flowing into the cylindrical heat exchange apparatus.

Suitable apparatus in which to conduct the process of this invention is also disclosed in the Miller et al. Patent No. 2,898,092 and illustrated in FIGURES 3 and 4, wherein the gas is admixed with the liquid to be processed prior to introduction into the heat exchange chamber of the cylindrical apparatus. After the streams of gas and liquid are merged, the mixture of gas and liquid enters the processing chamber of the cylindrical heat exchanger in a relatively homogeneous form.

The gas which is used in the present invention is one having a boiling point well below that of the temperature ordinarily encountered in the crystallization procedure. Ordinarily such gases should have a boiling point below −50° F. The gas should be substantially non-reactive with both the solvent and the materials dissolved in the solution and should not be appreciably soluble in the solution. Suitable gases include carbon dioxide, methane and nitrogen. Air may also be used under certain circumstances, but this is ordinarily undesirable where materials which are susceptible to oxidation, such as fruit juices, are to be concentrated. Nitrogen is ordinarily the preferred gas although other inert gases, such as argon and helium, may be used. With vinegar and similar materials which resist oxidation, air is the preferred gaseous medium.

The flow rate of gas passed into the heat exchanger with the liquid to be crystallized or concentrated can vary from about one-half that of the liquid to 4 to 5 times the flow rate of the liquid. In the concentration of vinegar the flow rate for air is preferably 2 to 4 times that of the vinegar. For concentration of fruit juices the flow rate of the gas is preferably somewhat less and preferably is about equal to that of the liquid.

The stream of gas which is admixed with the stream of liquid prior to contact with the chilled cylindrical heat transfer surface provides at least two advantages over conventional procedures. First, the mixture of gas and liquid is in the form of a dispersion of fine gas bubbles in the liquid and, on freezing, the mixture forms a porous solid which is relatively soft and easily scraped off the chilled surface. When the liquid is an aqueous liquid, a soft "white" ice is formed which is easily removed with relatively little expenditure of energy, thus avoiding the release of energy in the form of heat in the heat exchanger, thereby improving efficiency of the freezing operation. Second, the mixture of gas and liquid is subjected to centrifugal force in the heat transfer cylinder by reason of the rotating shaft and blades disposed therein. As a result, the more dense fluid (comprising liquid and small gas bubbles) is propelled against the cylindrical heat transfer surface, and the less dense fluid (comprising mainly gas with a lesser amount of liquid) migrates toward the rotating shaft. Thus solid (e.g., ice) formation on the shaft is minimized and the efficiency of the heat exchange unit is increased.

The invention can be readily understood by reference to FIGURE 1 of the attached drawings which is in the form of a process flow sheet illustrating the system for the production of 200 grain vinegar from 120 grain vinegar at a capacity of 750–1000 pounds per hour. Vinegar of 300 grain strength or higher may also be produced at reduced capacities in this system. Vinegar as supplied to the food processor is normally packaged at a concentration of 100–125 grain. Recently, the pickle packing industry had demanded the production of 200 grain and higher concentration vinegar for use in preparing brine for steeping cucumbers. The use of 200 grain vinegar, in addition to reducing the volume requirement for vinegar addition, also permits the pickle producer to use brine for longer periods than is possible with low grain vinegar. A further advantage to the use of 200 grain vinegar is savings in freight storage.

The following description of the invention as illustrated in the drawings is given to show the concentration of aqueous vinegar on a commercial scale. It will be understood that this invention is not to be limited to vinegar as disclosed in this example but is applicable to a variety of aqueous and organic fluids and may be conducted under a wide variety of operating conditions other than those described herein.

The process shown in FIGURE 1 of the attached drawings involves slush freezing of vinegar at an intermediate strength of about 170 grain, with the subsequent removal of ice from the slush, to concentrate the effluent from the centrifugal separator to 200 grain. As shown in the drawings, vinegar of 170 grain strength in a tank 10 is continuously metered through a three-cylinder ammonia-jacketed cylindrical heat exchanger, generally indicated by 20. Vinegar is removed from the tank 10 via a line 11 to the inlet side of a feed pump 12 and pumped (at 25 p.s.i.g. and 30° F. at a rate of 6–8 gallons per minute) through a line 13 to the inlet side of the heat exchange unit 20. The vinegar passes through the three central cylinders 21, 22 and 23 (6.1 inches inside diameter and 72 inches long with an axial shaft 4$^{15}/_{16}$ inches in outside diameter and 72 inches long, providing an annular volume of 0.428 cubic feet in each cylinder and a heat transfer surface of 9 square feet) of the cylindrical heat exchanger unit connected by lines 24 and 25, and emerges via a line 26 as a slurry of ice and concentrated vinegar (at a temperature at about 17° F.). Simultaneously with cooling, air is injected into the system in order to reduce the tendency of the three-cylinder heat exchanger unit 20 to ice up, thereby reducing the power requirement for the heat exchange unit. The air is provided to the system by means of a compressor 30 and a line 31 which connects with the vinegar line 13. A pressure indicator 32 and a pressure regulator 33 in conjunction with a flow indicator 34 and a needle valve 35 control the flow of compressed air to the heat exchange apparatus. The flow rate of air passing through the cylindrical heat exchange unit is preferably two to three times the input rate of the vinegar. The internal shaft bearing the scraper blades is rotated at a speed of approximately 387 r.p.m. in this run. The product on emission from the heat exchange unit, via line 26, contains 20 percent to 25 percent ice in the form of a slurry in concentrated vinegar. This material is conducted by a line 26 to a 200 gallon stainless steel surge tank 40 equipped with a rotary agitator 41 driven by a motor 42. The surge tank 40 serves to feed a basket-type centrifuge 45 on an intermittent basis.

About 100 gallons of slush of ice and vinegar is fed into the centrifuge 45 through a line 43 and a valve 44 in a period of about two ond one-half minutes. The slush is then centrifuged for about fourteen minutes and at the end of this period the ice is removed from the centrifuge by a pneumatically operated plow (not shown). The removal operation requires about two minutes. The centrifuge is then ready for a subsequent charge of about 100 gallons of slush. The centrifugation cycle can be automatically timed and controlled by conventional electrical control equipment. Ice at a vinegar concentration of 10–20 grains emits from the bottom 46 of the centrifuge 45 into a 500 gallon wooden tank 50. The liquid effluent (concentrated vinegar) passes via a line 51a into a 500 gallon wooden tank 51 at a concentration of about 200 grains. The centrifuge 45 is powered by a hydraulic power unit 47.

Tanks 50 and 51 contain level control devices 52 and 53 so adjusted that when the level of liquid in each tank reaches a predetermined height the liquid from each tank is pumped by means of pumps 54 and 55, respectively, to storage tanks 60 and 61, respectively, via lines 62 and 63, the level controls 52 and 53 controlling the pumps 54 and 55, respectively, by means of motor switches 56 and 57.

Concentrated (200 grain) vinegar is stored in the tank 61 and withdrawn therefrom for commercial use or shipment. Part of the 200 grain vinegar collected in the tank 51 is blended with 120 grain vinegar in the tank 10 to produce 170 grain vinegar for process. This is done by removing 200 grain vinegar from the tank 51 via line 120, pump 121, valve 122 and line 123 and pumping the 200 grain vinegar into tank 10 at a rate of 4 to 5 gallons per minute. The remainder of the 200 grain vinegar is collected in the tank 61 at a rate of 750 to 1000 lbs. per hour.

A supply of 120 grain vinegar is stored in a tank 65 and is transferred to feed tank 10 from time to time as the level in tank 10 falls. A level control 66 and motor switch 67 control the transfer of 120 grain vinegar from the tank 65 via line 68, pump 70 controlled by the motor switch 67 and line 71 containing a valve 72 and a flow indicator 73. Vinegar is first cooled by passage through cooling coils 74 disposed within the tank 50 wherein ice from the centrifuge 45 chills the incoming vinegar at a rate of two to four gallons per minute. The chilled vinegar returns from the cooling coil 74 via a line 75 to replenish the vinegar in the storage tank 10. The 10–20 grain vinegar produced by melting ice in tank 50 is removed via a line 62, a pump 54 and a line 62a to a storage tank 60. The removal of vinegar from the tank 50 is controlled by a level control 52 which operates a motor switch 56 which controls the motor which drives the pump 54.

The three-cylinder heat exchanger indicated by 20 contains concentric jackets 81, 82 and 83 surrounding heat transfer cylinders 21, 22 and 23, respectively, through which jackets a cooling medium such as liquid ammonia is passed. A supply of liquid ammonia is stored in an insulated tank 84 and passes via a line 85 through a solenoid valve 86 to the jackets 81, 82 and 83. After passing through the jackets 81, 82 and 83 of the heat exchanger and absorbing heat from the vinegar contained in the heat transfer cylinders 21, 22 and 23 within said jackets, the ammonia vapor passes out of the jackets 81, 82 and 83 via lines 110, 110a and 110b and is returned to the storage tank 84. An ammonia compressor 90 (which in this example has a capacity of sixteen tons at $-20°$ F.) compresses ammonia and passes the ammonia under pressure through a line 91 to a condenser 92, where the ammonia is liquefied, and the liquid ammonia from the condenser 92 passes via a line 93 and valve 93a to a receiver 94. From the receiver 94 the liquid ammonia passes via a line 95 and valves 95a and 95b through an expansion valve 96 into the storage tank 84. The expansion valve 96 is actuated by a level sensing device 96a which closes valve 96 when the liquid level in the tank 84 reaches a predetermined point, thus maintaining the level of liquid ammonia in the proper range. Ammonia gas which collects in tank 84 passes from this tank via a line 112, pressure regulator 113 and valves 114 and 115 to the inlet side of the compressor 90 for recycle. Cooling fluid for the condenser 92 is supplied by a line 100 leading from a supply tank 101 to the condenser 92, returning to the supply tank 101 via a line 102. Cooling water from the condenser is also passed via a line 103 through a cooling coil 104 located in the tank 50 which is chilled from ice from the centrifuge 45. Chilled water from the coil 104 returns to the water supply tank 101 via a line 105. Lines 87, 87a and 87b are return lines for the return of liquid ammonia from the jackets 81, 82 and 83 to the tank 84 in the event that solenoid valves 86 and 111 are closed. Valves 86 and 111 are actuated by motor controls (not shown) connected with the motors which drive the rotating agitator shafts within the heat transfer cylinders 21, 22 and 23 and are closed in the event of motor overload resulting from excessive ice formation on the heat exchange surfaces of the cylinders 21, 22 and 23. When the valves 86 and 111 are closed, the liquid ammonia contained in jackets 81, 82 and 83 is forced very rapidly by the pressure increase, caused by vaporization of part of the ammonia, through the lines 87, 87a and 87b into the tank 84. This removes the refrigerant from the jackets 81, 82 and 83, thereby preventing further ice formation in the cylinders 21, 22 and 23. The flow of vinegar through the cylinders 21, 22 and 23 contributes to the melting of the excess of ice, thus returning the heat exchanger unit 20 to normal operation.

FIGURE 2 of the drawing illustrates the gas injection nozzle which is used in the apparatus disclosed in FIGURE 1. The nozzle generally comprises a T 130 suitably threaded to be connected to the liquid feed line 13 by threads 131. One arm of the T is equipped with threads 132 to receive a drilled plug 133 carrying an inner tube 134 having suitable threads 135 for connection to the gas line 31, as by a coupling 139. Plug 133 has threads 136 which engage threads 132 of the T. The hollow inner tube 134 is suitably affixed to the plug 133 as by weld 137. Hollow tube 134 projects into the T for a distance of three to five inches. The end of the tube 134 is closed with an orange peel joint 140 and four small apertures 138 approximately $\frac{1}{32}$ inch in diameter are located about one inch from the closed end of the tube. The open end of the T 130 is connected to the cylindrical heat exchange apparatus via lines 13a.

In operation the liquid to be concentrated enters the nozzle via the lower end 13, shown in FIGURE 2, and passes through the approximately annular space between the inner tube 134 and the outer tube 13a. Gas from the line 31 enters the nozzle through the open end of tube 134 through a suitable fitting 139 and passes through the tube 134 and into the liquid in line 13a via the apertures 138. The mixture of liquid and gas passes into the heat exchange unit via line 13a.

Figure 4:
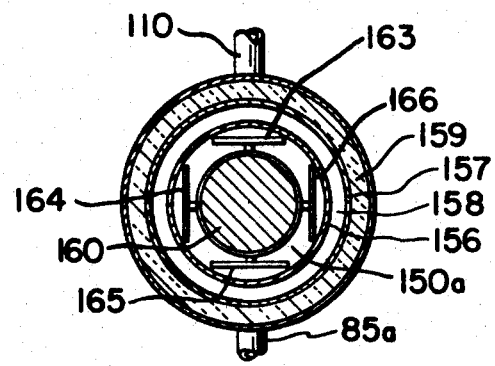
Figure 3:
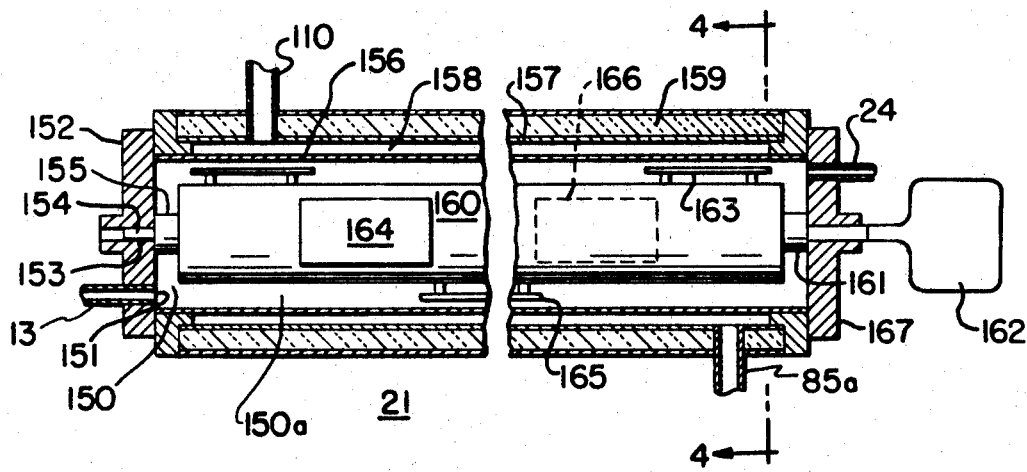
FIGURE 3 is a longitudinal sectional view of a cylindrical heat exchange apparatus suitable for use in this invention; and, FIGURE 4 is a sectional view through the heat exchange apparatus taken on line 4—4 of FIGURE 3.

FIGURES 3 and 4 show in more detail the construction of the heat transfer cylinder 21. This heat transfer cylinder is identical in construction and operation to heat transfer cylinders 22 and 23. Considering FIGURE 3, the fluid material enters chamber 150 under pressure through an aperture 151 in cover 152 connected to the conduit 13 and moves toward the central axis of that chamber. The cover may have an axial opening 153 for receiving a mounting stub shaft 154 attached to stub shaft end 155 of the main shaft 160 and sealed to the cover by a suitable seal. The chamber in the form as shown includes an elongated stationary heat transfer cylinder or tube 156 encompassed by a jacket 157 to provide an annular space 158 through which a suitable heat exchange medium (such as liquid ammonia) may be circulated for the purpose of cooling the material passing through the chamber. Suitable insulation 159 may surround the jacket and cooling fluid may be supplied through a conduit 85a, the heat exchange medium passing from the jacket through the outlet conduit 110. Within the heat transfer cylinder a suitable shaft 160 having an enlarged diameter central portion and reduced diameter stub ends 155 and 161 is mounted, being adapted to be driven from one end as by means of a motor 162. Between the surface of the enlarged diameter portion of the shaft 160 and the smooth peripheral inner wall of the heat transfer cylinder 156, a relatively thin annular space 150a is provided for passage of the material longitudinally of the chamber. Mounted upon shaft 160 preferably in fixed relation thereto and in overlapping longitudinal relation to each other is a plurality of angularly spaced blades 163, 164, 165 and 166 adapted to remove material from contact with the surface of the heat transfer cylinder 156. At the outlet end of the chamber a cover 167 is suitably affixed thereto, the cover having an outlet conduit 24.

The production of 400 grain vinegar from 120 grain vinegar can be carried out substantially as disclosed above but with certain modifications in conditions and equipment to accommodate the different concentrations. 120 grain vinegar is blended with 400 grain vinegar to produce 320 grain vinegar and the latter is continuously metered through a one-cylinder 24-inch x 10-foot ammonia jacketed heat exchanger where it is cooled from 30° F. to about 6° F. The inside diameter of the heat transfer cylinder is 24 inches, providing 60 square feet of cooling surface. The outside diameter of the axial shaft is 21 inches, providing an annular space between the shaft and heat transfer surface of 5.37 cubic feet. The shaft is rotated at 125 r.p.m. The refrigerating system has a capacity of 30 tons at −20° F. The air injection is provided by means of a one horsepower compressor. Three volumes of air to one volume of vinegar are mixed with the 320 grain vinegar through a mixing nozzle as shown in FIGURE 2 just prior to the introduction of the vinegar to the heat exchanger. The product emitting from the heat exchanger contains about 20% ice which is removed centrifugally and has 10 to 20 grain vinegar concentration. The concentrated vinegar (400 grain strength) is produced at a rate of 420 lbs. per hour. This same procedure will produce 600 lbs. per hour of 300 grain vinegar.

Non-aqueous fluids can be crystallized by the procedure described above. For example, p-dichlorobenzene and DDT have been crystallized and flaked by the following procedure:

Commercial 2,2 - bis(p - chlorophenyl) - 1,1,1 - trichloroethane (DDT) was melted by adding it to agitated boiling water and allowing the melted compound to settle to the bottom of the tank. This procedure eliminates the possibility of product degradation due to excessive heat. The molten compound was drawn off from the bottom of the tank to another jacketed tank where the last traces of water were removed by heating the material to approximately 220° F. until a clear melted product was formed. The melted product was then cooled to approximately 200° F. and transferred by means of a pump immersed in an oil bath at 195° F. to a rotating cylindrical heat exchanger. At the inlet to the heat exchanger, provision was made for the introduction of carbon dioxide gas into the molten DDT through a nozzle similar to that of FIGURE 2. At the outlet end of the heat exchanger there was a back pressure valve and an extrusion nozzle having a slit of 1/16 inch x 5 inches. All piping was jacketed or steam traced and the rotating heat exchange unit was kept at a temperature of 205° F. The back pressure valve was adjusted for a pressure of 100–180 p.s.i.g. The crystalline DDT was extruded through the extrusion nozzle at a rate of 150 pounds per hour, the holding time of the product in the nozzle being 2.7 seconds. The extruded carbonated DDT was collected on a belt and cooled with a blast of air at a temperature of about 20° F. The product obtained had a specific gravity of 1.238 as compared to the ordinary specific gravity of 1.423 for untreated DDT.

In processes which use gases such as carbon dioxide, nitrogen, methane, helium and argon, it is desirable to provide systems for recovery of the gases after the crystallization steps are completed. For instance, in the procedure diagrammed in FIGURE 1, if a gas other than air were used it could be recovered by enclosing the tank 40 and drawing gas out of the tank to a recovery tank and compressor unit for reuse in the operation.

We claim:

1. Method of concentrating vinegar by slush freezing which comprises cooling the vinegar, passing a stream of air concurrently into a stream of cooled vinegar to form a fluid containing small air bubbles which are uniformly mixed with the vinegar, the flow rate of the air stream being in the range of one-half to five times the flow rate of the vinegar stream, passing the resulting fluid mixture of vinegar and air into a heat transfer cylinder surrounded by refrigeration means, said heat transfer cylinder having a rotatable shaft internally disposed axially thereof, thereby defining an elongated narrow annular space through which said fluid mixture is passed, said shaft having scraper blades affixed thereto and adapted to move throughout the annular space containing the fluid mixture between the shaft and the inner surface of the heat transfer cylinder and scrape the inner surface of said heat transfer cylinder, agitating said fluid mixture of air and vinegar in the annular space between said shaft and the inner surface of said heat transfer cylinder, cooling the heat transfer cylinder to a temperature below the freezing point of the vinegar to cause formation of porous ice on said inner surface of said heat transfer cylinder, removing ice from said surface by means of said scraper blades, discharging the resulting mixture of vinegar, air and ice from said heat transfer cylinder, centrifuging said mixture to separate ice from the concentrated vinegar, and recovering the concentrated vinegar.

2. Method of claim 1 wherein the flow rate of the air stream is in the range of two to four times the flow rate of the vinegar stream.

3. The process in claim 1 wherein the vinegar is cooled by heat exchange with ice that is crystallized and separated from the vinegar in a subsequent stage of the process, and wherein the ice separated from the concentrated vinegar is utilized to cool the condenser of the refrigerator means and for cooling the vinegar prior to treatment.

4. A method of further concentrating a vinegar solution of 120 grain concentration comprising cooling the solution in heat exchange with ice that is crystallized and separated from the solution in a subsequent stage of the process, concentrating to 170 grain by admixture with a more concentrated solution obtained in a further stage of the process, slush freezing the 170 grain vinegar by passing a stream of air concurrently into a stream of the cooled vinegar to form a fluid containing small air bubbles which are uniformly mixed with the vinegar, the flow rate of the air stream being in the range of one-half to five times the flow rate of the vinegar stream, passing the resulting fluid mixture of vinegar and air into a heat transfer cylinder surrounded by refrigeration means, said heat transfer cylinder having a rotatable shaft internally disposed axially thereof, thereby defining an elongated narrow annular space through which said fluid mixture is passed, said shaft having scraper blades affixed thereto and adapted to move throughout the annular space containing the fluid mixture between the shaft and the inner surface of the heat transfer cylinder and scrape the inner surface of said heat transfer cylinder, agitating said fluid mixture of air and vinegar in the annular space between said shaft and the inner surface of said heat transfer cylinder, cooling the heat transfer cylinder to a temperature below the freezing point of the vinegar to cause formation of porous ice on said inner surface of said heat transfer cylinder, removing ice from said surface by means of said scraper blades, discharging the resulting mixture of vinegar, air and ice from said heat transfer cylinder, centrifuging said mixture to separate ice from the concentrated vinegar, utilizing said ice for cooling the condenser of the refrigerator means and for cooling the 170 grain vinegar prior to treatment, and recovering the more concentrated vinegar solution for admixture with the 120 concentrate in forming the 170 grain concentrate.

References Cited

UNITED STATES PATENTS

| | | | |
|---|---|---|---|
| 3,051,456 | 8/1962 | Clarke | 62—342 |
| 3,102,036 | 8/1963 | Smith | 62—58 |
| 3,285,025 | 11/1966 | Shaul | 99—199 |

NORMAN YUDKOFF, *Primary Examiner.*

WILBUR L. BASCOMB, JR., *Examiner.*

G. P. HINES, *Assistant Examiner.*